US010813498B2

(12) United States Patent
Sarnoff et al.

(10) Patent No.: US 10,813,498 B2
(45) Date of Patent: Oct. 27, 2020

(54) PAN IN COMBINATION WITH A THERMAL BAG

(71) Applicant: Handi-Foil Corp., Wheeling, IL (US)

(72) Inventors: Norton Sarnoff, Boca Raton, FL (US); David Sarnoff, Northbrook, IL (US)

(73) Assignee: Handi-Foil Corp., Wheeling, IL (US)

( * ) Notice: Subject to any disclaimer, the term of this patent is extended or adjusted under 35 U.S.C. 154(b) by 5 days.

(21) Appl. No.: 16/353,498

(22) Filed: Mar. 14, 2019

(65) Prior Publication Data
US 2020/0268206 A1 Aug. 27, 2020

Related U.S. Application Data

(63) Continuation-in-part of application No. 16/286,735, filed on Feb. 27, 2019.

(51) Int. Cl.
*A47J 41/00* (2006.01)
*A47J 36/36* (2006.01)
*B65D 81/38* (2006.01)
*B65D 33/24* (2006.01)

(52) U.S. Cl.
CPC ........... *A47J 41/0066* (2013.01); *A47J 36/36* (2013.01); *A47J 41/0038* (2013.01); *A47J 41/0061* (2013.01); *B65D 33/24* (2013.01); *B65D 81/3888* (2013.01)

(58) Field of Classification Search
CPC .......... B65D 83/0066; B65D 2231/001; B65D 33/10; B65D 33/2575; B65D 83/0055; B65D 33/2589; B65D 81/3888; B65D 33/24; A47J 42/40; A47J 42/44; A47J 41/0066; A47J 36/36; A47J 41/0061; A47J 41/0038

USPC ................ 220/781, 380; 206/499, 503–515; 383/25, 30, 31
See application file for complete search history.

(56) References Cited

U.S. PATENT DOCUMENTS

| 2,336,699 | A | * | 12/1943 | Neth | A47J 36/04 220/4.24 |
| 3,507,312 | A | * | 4/1970 | Petersen | A47J 45/10 220/737 |
| 3,730,076 | A | * | 5/1973 | Levin | B65D 33/01 99/347 |
| 3,876,812 | A | | 4/1975 | Peters | |
| 3,923,237 | A | * | 12/1975 | Bostrom | B29C 66/542 220/305 |
| 3,938,726 | A | | 2/1976 | Holden | |

(Continued)

FOREIGN PATENT DOCUMENTS

| GB | 1026867 | 4/1966 |
| JP | 2002058521 | 2/2002 |

(Continued)

OTHER PUBLICATIONS

Toaks Titanium 750ML Pot, Toaks®, toaksoutdoor.com, Feb. 12, 2019.

(Continued)

*Primary Examiner* — Kareen K Thomas
(74) *Attorney, Agent, or Firm* — Adam K. Sacharoff; Much Shelist, P.C.

(57) ABSTRACT

In summary there is provided in one embodiment a combination of a pan and thermal bag used to maintain hot or cold temperatures of food placed in the pan.

8 Claims, 21 Drawing Sheets

(56) References Cited

U.S. PATENT DOCUMENTS

| | | | |
|---|---|---|---|
| 3,962,961 A | 6/1976 | Peters | |
| 4,320,699 A | 3/1982 | Binks | |
| 4,337,812 A | 7/1982 | Trinkner | |
| 4,390,551 A | 6/1983 | Swartley | |
| 4,616,762 A * | 10/1986 | Alexander | A47J 36/022 |
| | | | 206/503 |
| 4,873,919 A | 10/1989 | Janssen | |
| 4,953,550 A * | 9/1990 | Dunshee | A61F 7/03 |
| | | | 383/102 |
| 5,188,234 A | 2/1993 | Fukuda | |
| 5,394,834 A * | 3/1995 | Queen | A01K 1/0125 |
| | | | 119/168 |
| 5,842,596 A | 12/1998 | Renfroe | |
| 5,887,708 A * | 3/1999 | Gonzales | B44D 3/02 |
| | | | 206/209 |
| 5,950,838 A * | 9/1999 | Fletcher | B65D 85/62 |
| | | | 206/499 |
| 6,237,803 B1 * | 5/2001 | Sarnoff | B65D 1/34 |
| | | | 220/318 |
| 6,302,319 B1 | 10/2001 | Peeples | |
| 6,313,446 B1 | 11/2001 | Jones | |
| 7,153,025 B1 * | 12/2006 | Jackson | A45C 7/0059 |
| | | | 383/2 |
| 7,395,943 B2 | 7/2008 | Karlsson | |
| 8,496,112 B2 | 7/2013 | Sarnoff | |
| 8,622,235 B2 * | 1/2014 | Suchecki | B65D 77/04 |
| | | | 220/592.23 |
| 8,844,755 B2 | 9/2014 | Sarnoff | |
| 8,881,905 B2 | 11/2014 | Sarnoff | |
| 8,887,943 B1 * | 11/2014 | Miller | A47J 39/006 |
| | | | 206/557 |
| 9,351,605 B2 | 5/2016 | Sarnoff | |
| 9,433,320 B2 | 9/2016 | Sarnoff | |
| 9,457,943 B1 | 10/2016 | Patel | |
| 9,510,699 B1 * | 12/2016 | Miller | A47G 19/12 |
| 10,005,609 B1 * | 6/2018 | Biene | H04Q 9/00 |
| 2002/0000442 A1 * | 1/2002 | Howard | A47J 36/027 |
| | | | 220/573.1 |
| 2004/0089658 A1 * | 5/2004 | Sarnoff | B65D 1/34 |
| | | | 220/4.24 |
| 2006/0175223 A1 | 8/2006 | Cassanovas | |
| 2007/0267374 A1 * | 11/2007 | Middleton | B65D 43/169 |
| | | | 211/126.1 |
| 2008/0063758 A1 * | 3/2008 | Kwiat | A21D 15/02 |
| | | | 426/120 |
| 2009/0266822 A1 | 10/2009 | Rankins | |
| 2010/0329590 A1 * | 12/2010 | Minkler | B65D 71/0096 |
| | | | 383/6 |
| 2011/0185682 A1 | 8/2011 | Rockwell et al. | |
| 2012/0328218 A1 * | 12/2012 | Jacoby | A45C 13/046 |
| | | | 383/25 |
| 2013/0048649 A1 | 2/2013 | Williams | |
| 2013/0114915 A1 | 5/2013 | Marom | |
| 2013/0183413 A1 | 7/2013 | Todys | |
| 2015/0056354 A1 * | 2/2015 | Blucher | A47J 36/06 |
| | | | 426/523 |
| 2015/0147006 A1 * | 5/2015 | Beatty | A45C 7/0063 |
| | | | 383/6 |
| 2016/0249768 A1 * | 9/2016 | Casey | A47G 19/08 |
| | | | 220/574 |
| 2017/0007074 A1 | 1/2017 | Difiore | |
| 2018/0092494 A1 | 4/2018 | Hayford | |
| 2018/0215523 A1 | 8/2018 | Chiang et al. | |

FOREIGN PATENT DOCUMENTS

| | | |
|---|---|---|
| WO | 2014169350 | 10/2014 |
| WO | 2015026832 | 5/2015 |

OTHER PUBLICATIONS

Berkley Jensen Oval Roasting Pans with Oven Bags, 2 ct., BJs ®, bjs.com, Item: 61177, Feb. 12, 2019.

Potluck' Casserole Tote, Nordstrom, shop.nordstrom.com, accessed: Feb. 2019.

Quick & Carry, Travel Tote Bag for 'Crock Pot' and Most Oval Shape Slow Cookers Quick & Carry™, quickandcarry.com, SKU: QC-1001, Feb. 12, 2019.

Shrink-Tight™ Pan Covers, PanSaver Professional Solution, pansaver.com, Apr. 28, 2016.

* cited by examiner

PAN IN COMBINATION WITH A THERMAL BAG

CROSS REFERENCE TO RELATED APPLICATIONS

The present application in a Continuation In Part of U.S. application Ser. No. 16/286,735 filed Feb. 27, 2019 and entitled Pan IN Combination With A Thermal Bag.

FIELD OF THE INVENTION

The present invention relates to pans and more particularly to baking and roasting pans having secured thereto in a convenient manner a hot/cold thermal bag which can be used to after food has been prepared to keep the food either hot or cold within the pan.

BACKGROUND OF THE INVENTION

Baking and roasting pans otherwise referred to herein generally as pans, have long been used to cook food in ovens or store food in the refrigerator. Often used with the pans are lids to help transport or store the prepared food. Once the food is prepared, if the user needs to transport the food, there is a possibility of hot food turning cold or cold food turning warm and thus ruining the food during transport or storage. As such, there is a need to provide a convenient manner in maintaining the freshness of the prepared food by a convenient manner in which a thermal bag is secured or packaged with the pan and which can be used to maintain prepared food either hot or cold without too much concern the food will ruin during transport.

SUMMARY OF THE INVENTION

In accordance with various embodiment of the present invention there is provided in combination a pan and a thermal bag. The pan is configured for use to prepare or with prepared food and is defined by a bottom base having a base periphery edge and a sidewall extending upwardly from the base periphery edge and terminating at a side edge to create a well therebetween. The thermal bag having a cavity and a flap end defined to fold over the cavity, the cavity configured to receive the pan with prepared food placed in the well of the pan, and wherein the thermal bag being made of a material to aid in maintaining a temperature of prepared food when placed within the cavity of the thermal bag. The pan preferably has a lid to help ensure the food contents do not spill into the bag. Lastly, an attaching mechanism to attach the thermal bag to the pan for storage and transport is provided. The attaching mechanism is configured to permit the thermal bag to be removeable from the pan for an end use. In various configurations lids may be provided to help secure the thermal bag and for use with the thermal bag.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
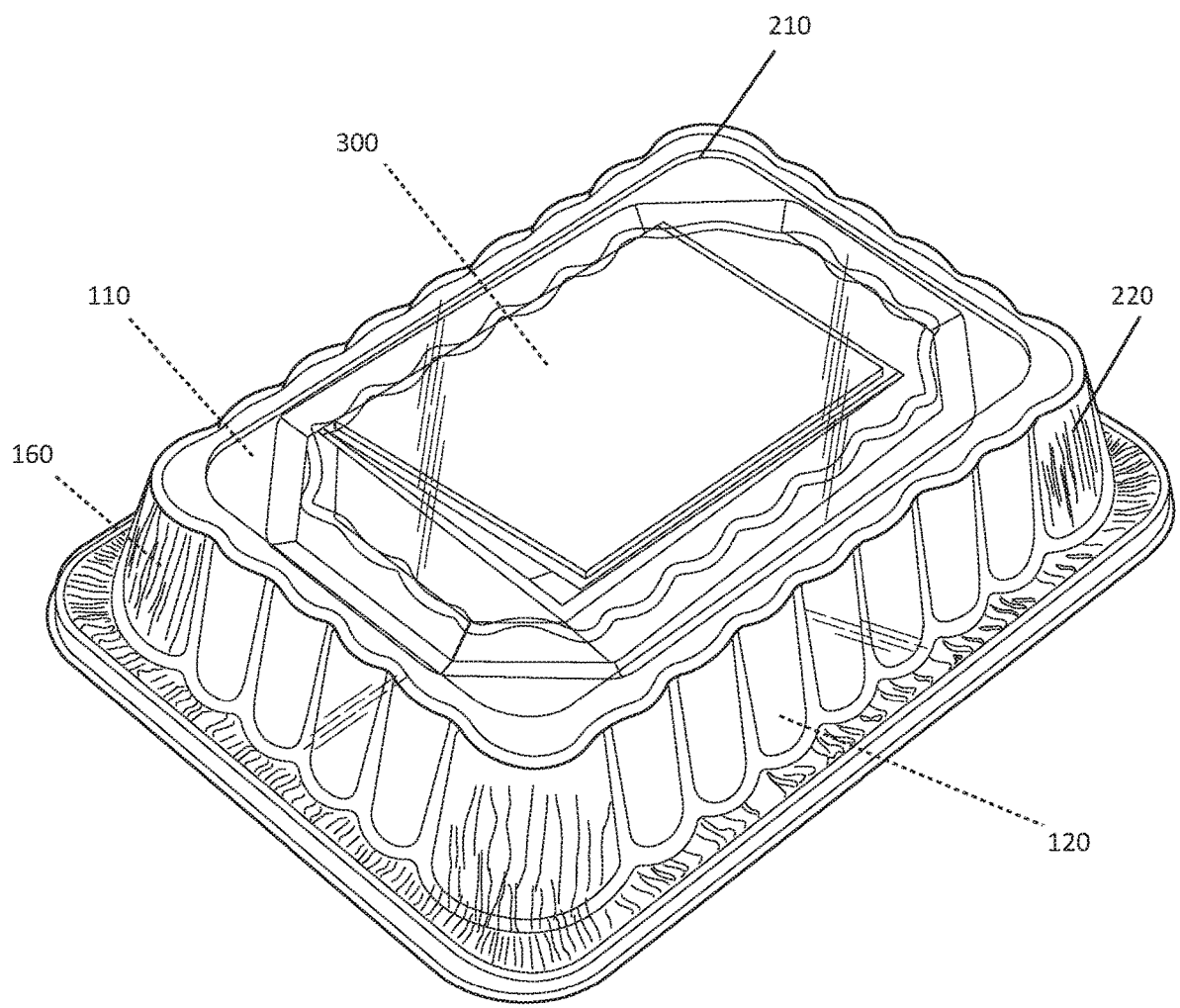
FIG. 1 is a perspective view of a pan and lid with a thermal bag all packaged together in an initial configuration.
Figure 2:
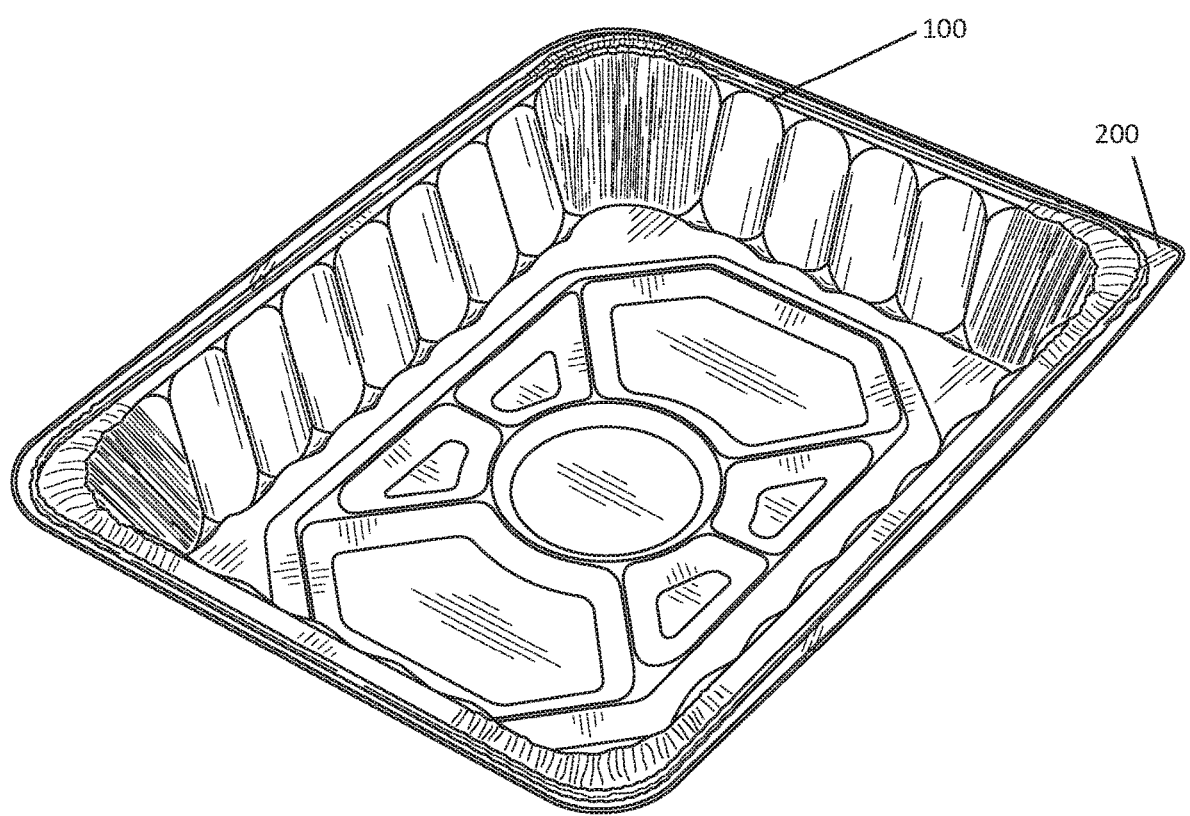
FIG. 2 is a perspective view of FIG. 1 from a top perspective.
Figure 3:
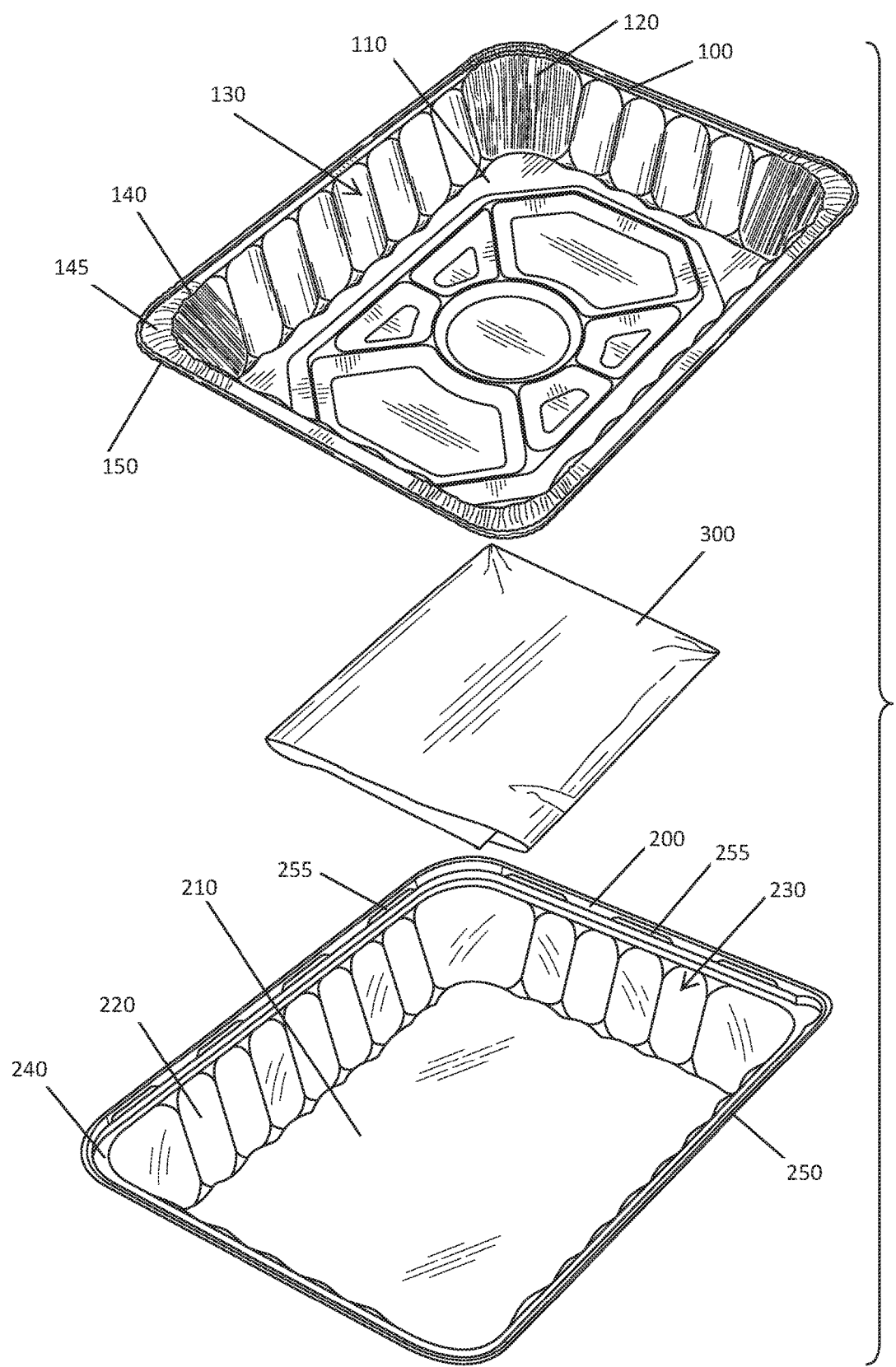
FIG. 3 is a perspective exploded view of the contents of FIG. 1.
Figure 4:
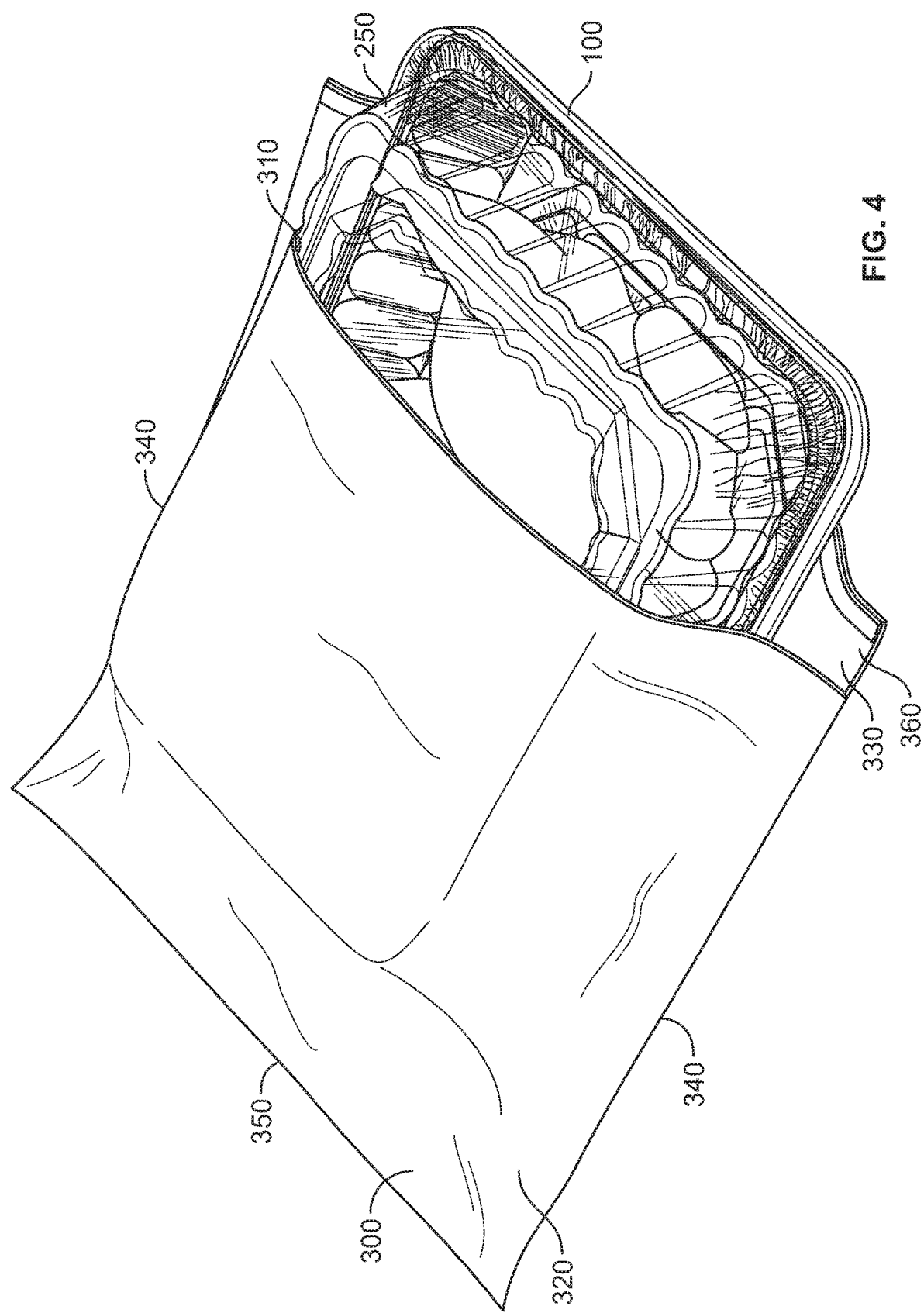
FIG. 4 is a perspective view of the pan and lid in a closed configuration with prepared food and being inserted into the cavity of the thermal bag.
Figure 5:
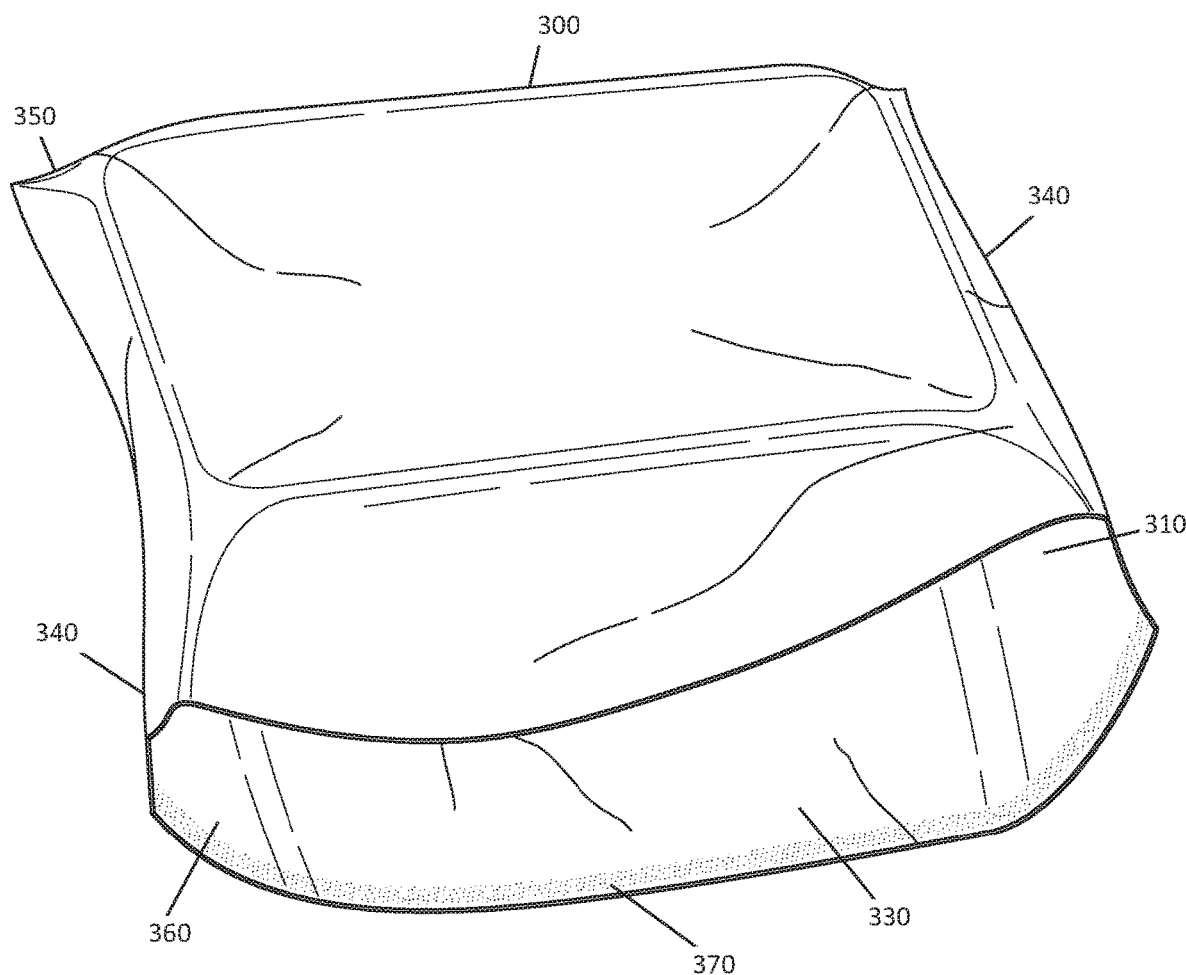
FIG. 5 is a perspective view of the thermal bag with the pan and lid already inserted.
Figure 6A:
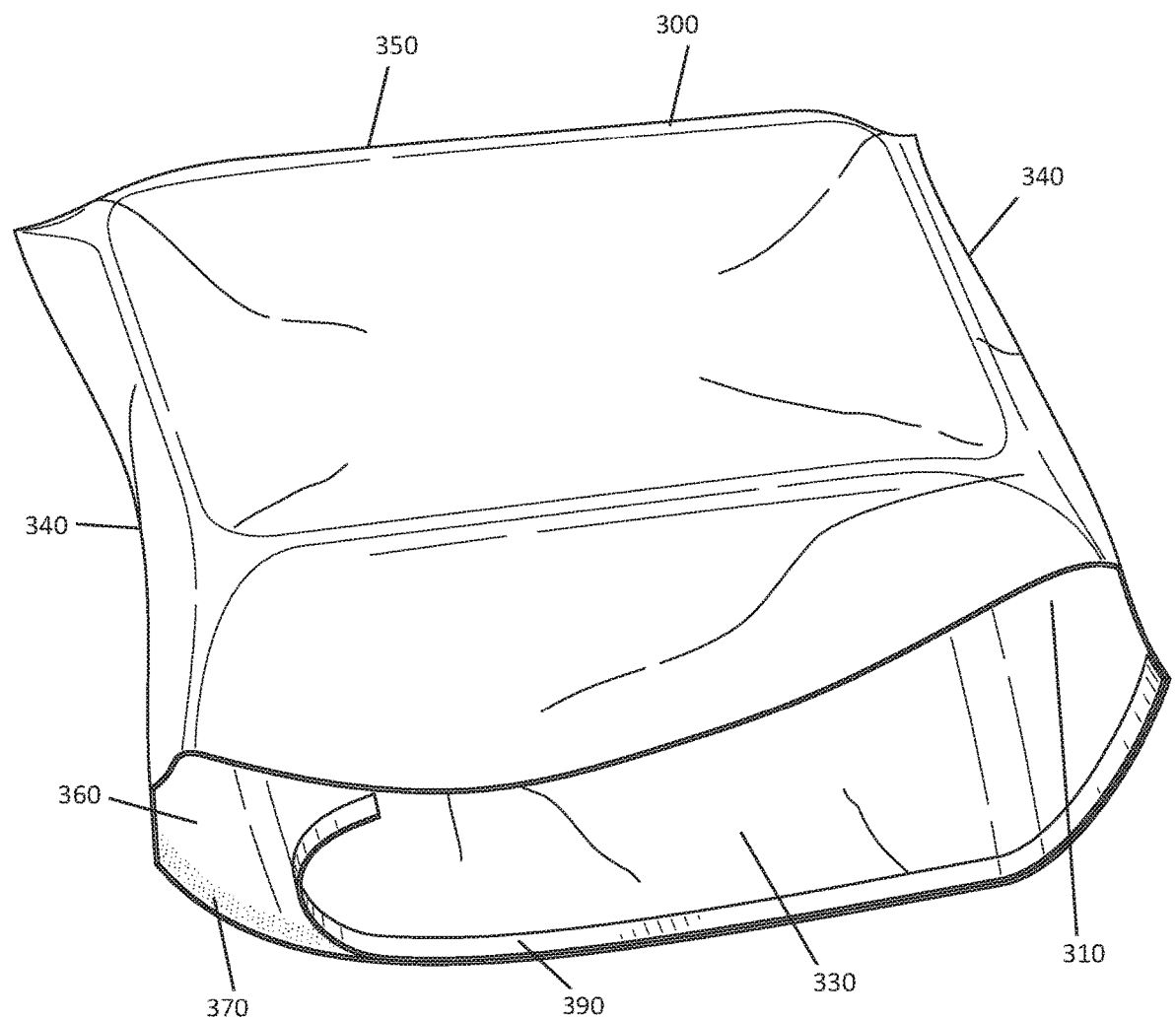
FIG. 6A is a perspective view of another embodiment illustrating the thermal bag with a strip of material covering the adhesive layer used to seal the thermal bag to a closed configuration.
Figure 6B:
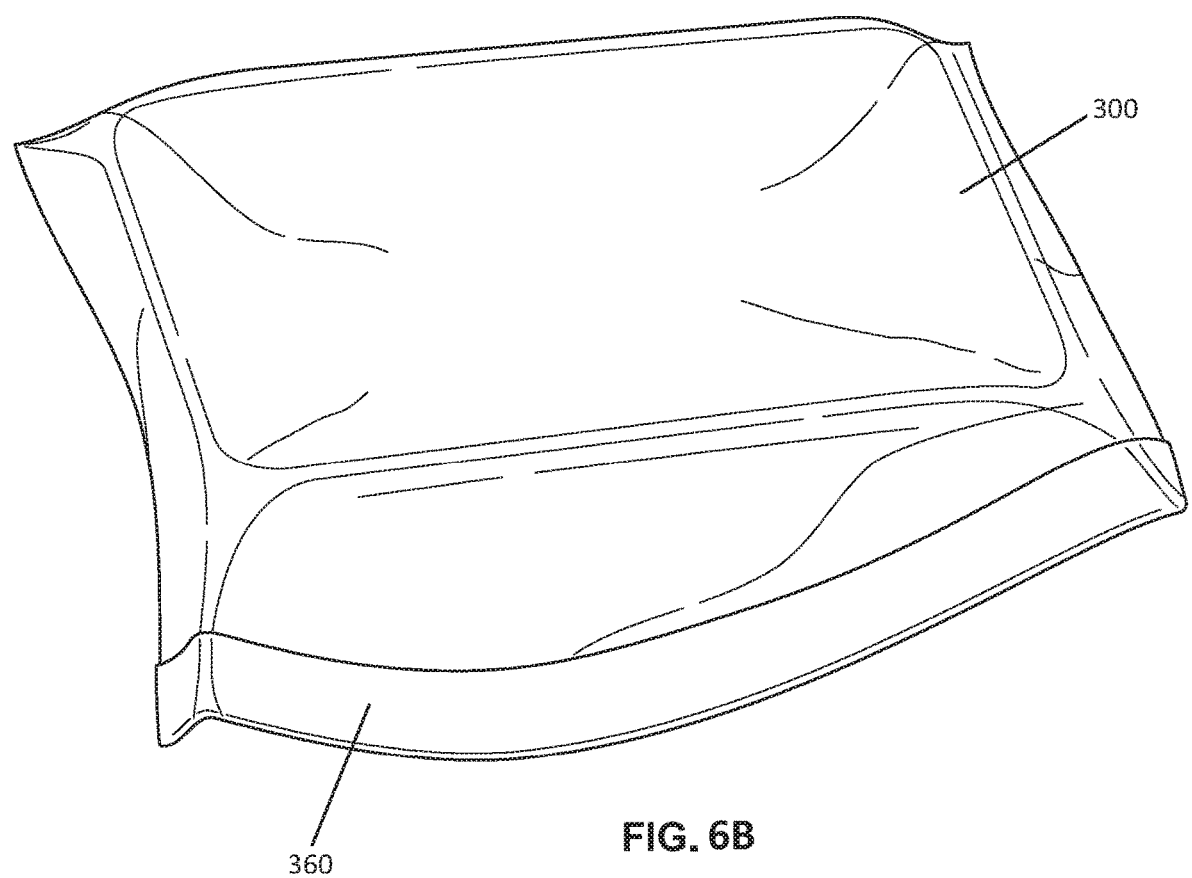
FIG. 6B is a perspective view of the thermal bag in the closed configuration with the pan/lid and prepared food stored inside.
Figure 6C:
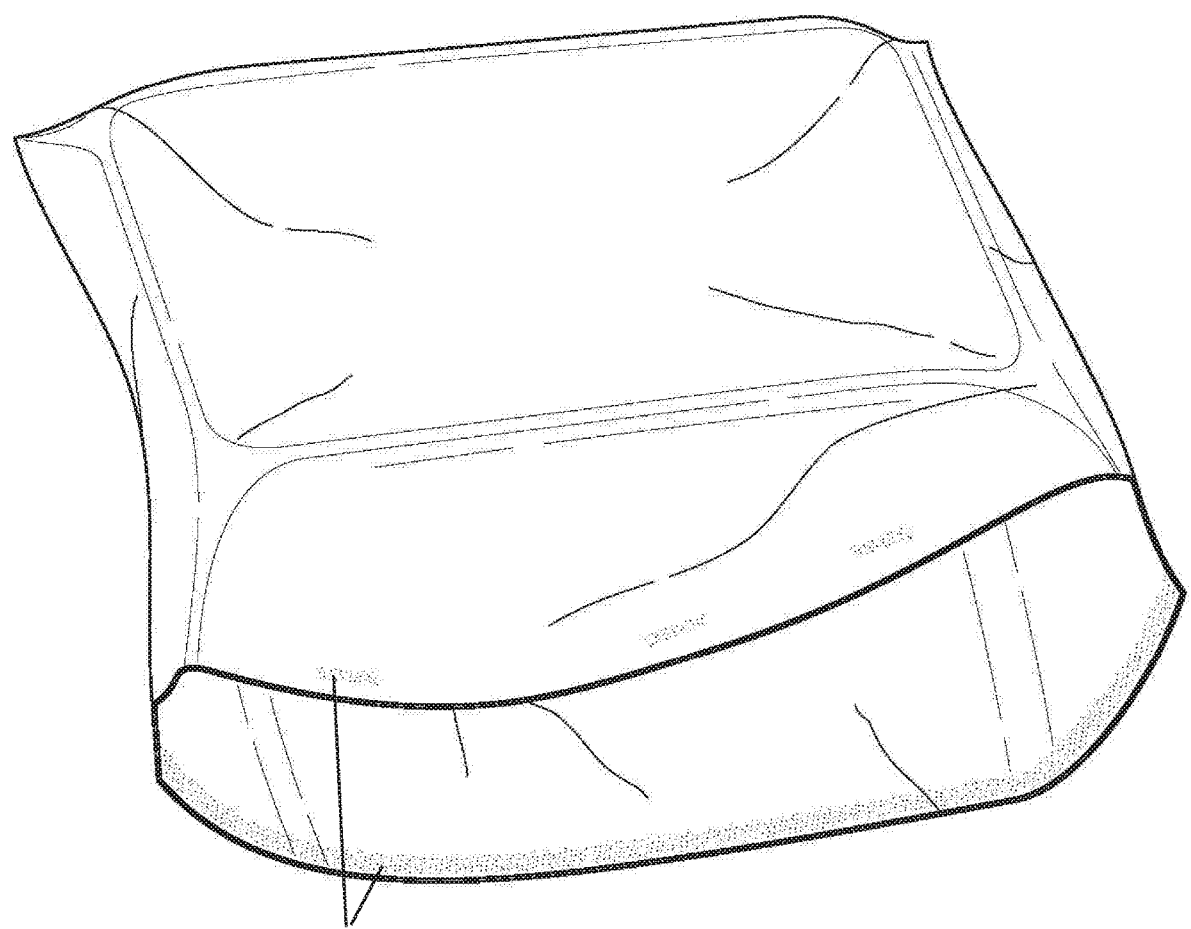
FIG. 6C is a perspective view of another embodiment illustrating a thermal bag used to seal the thermal bag to a closed configuration.
Figure 6D:
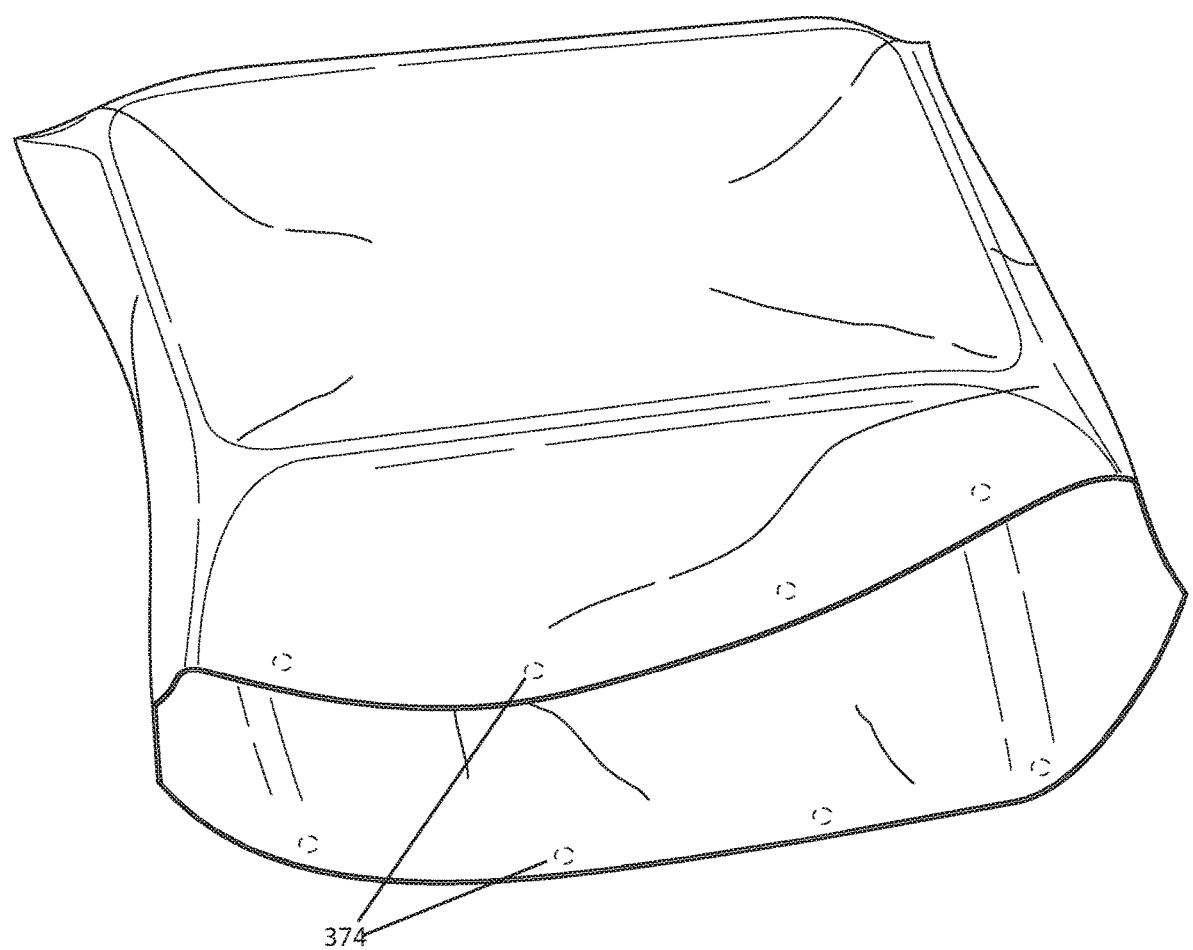
FIG. 6D is a perspective view of another embodiment illustrating a thermal bag used to seal the thermal bag to a closed configuration.
Figure 6E:
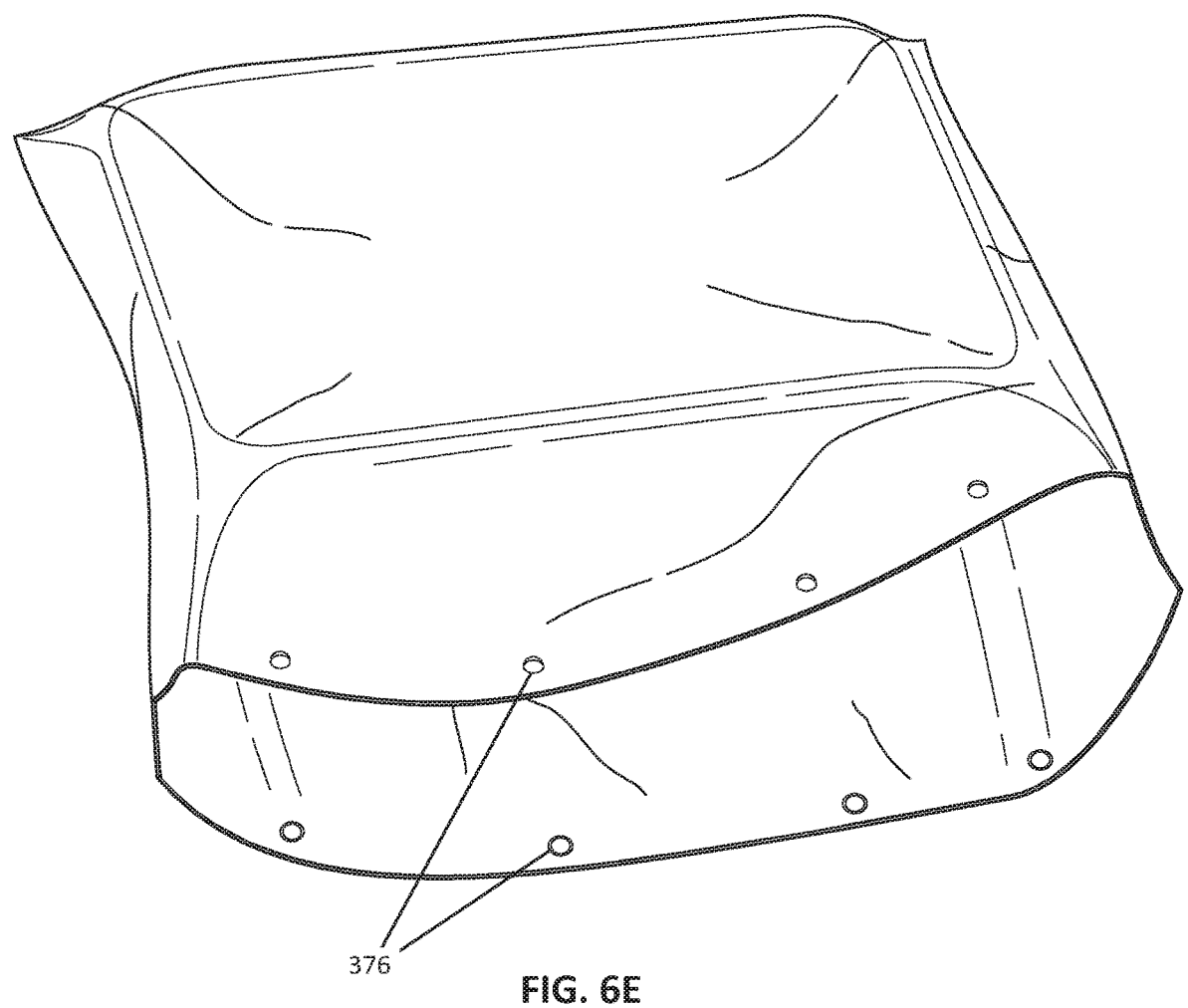
FIG. 6E is a perspective view of another embodiment illustrating a thermal bag used to seal the thermal bag to a closed configuration.
Figure 7:
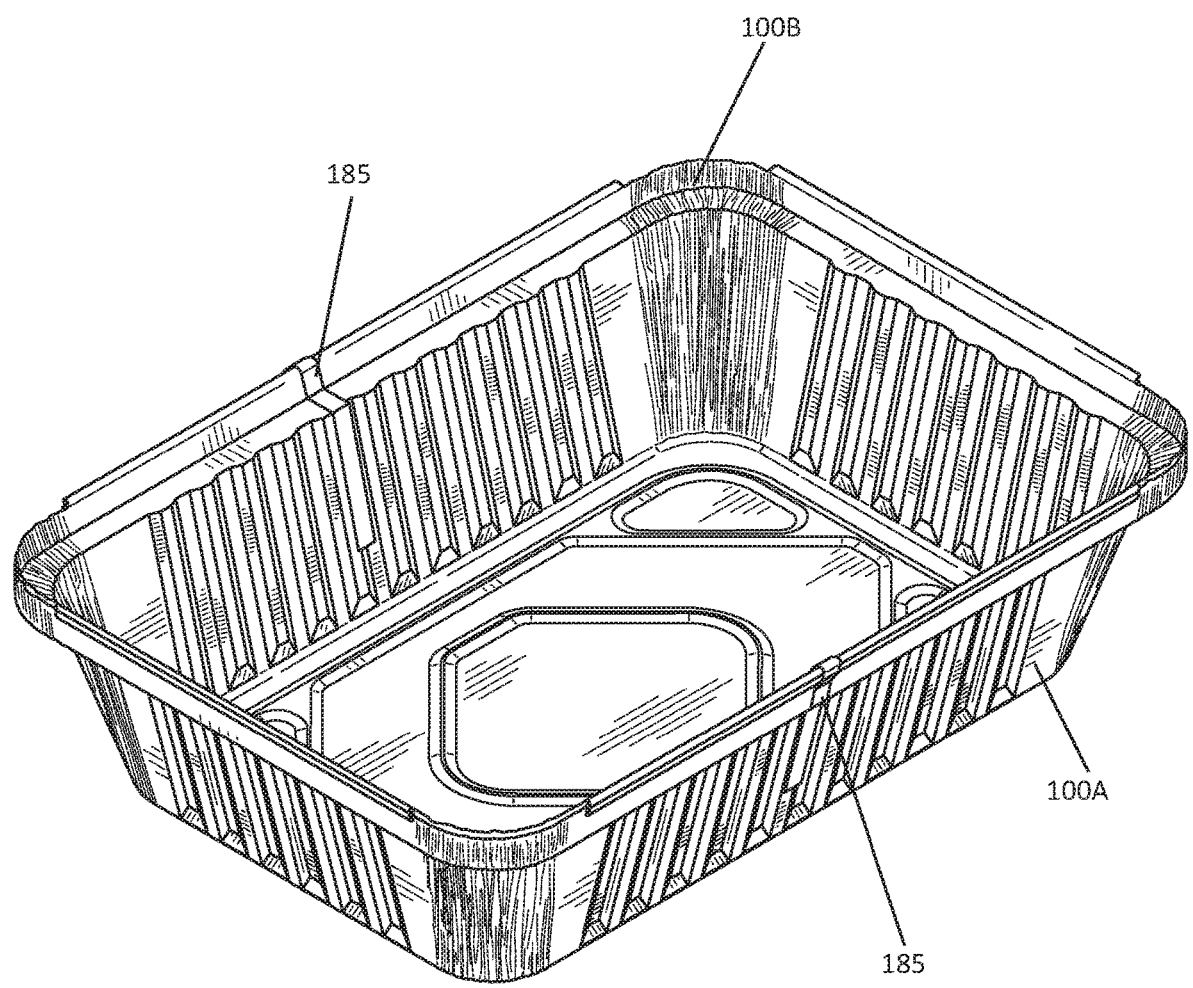
FIG. 7 is a perspective view of a pair of pans secured together in a first configuration and in accordance with an embodiment of the invention.
Figure 8:
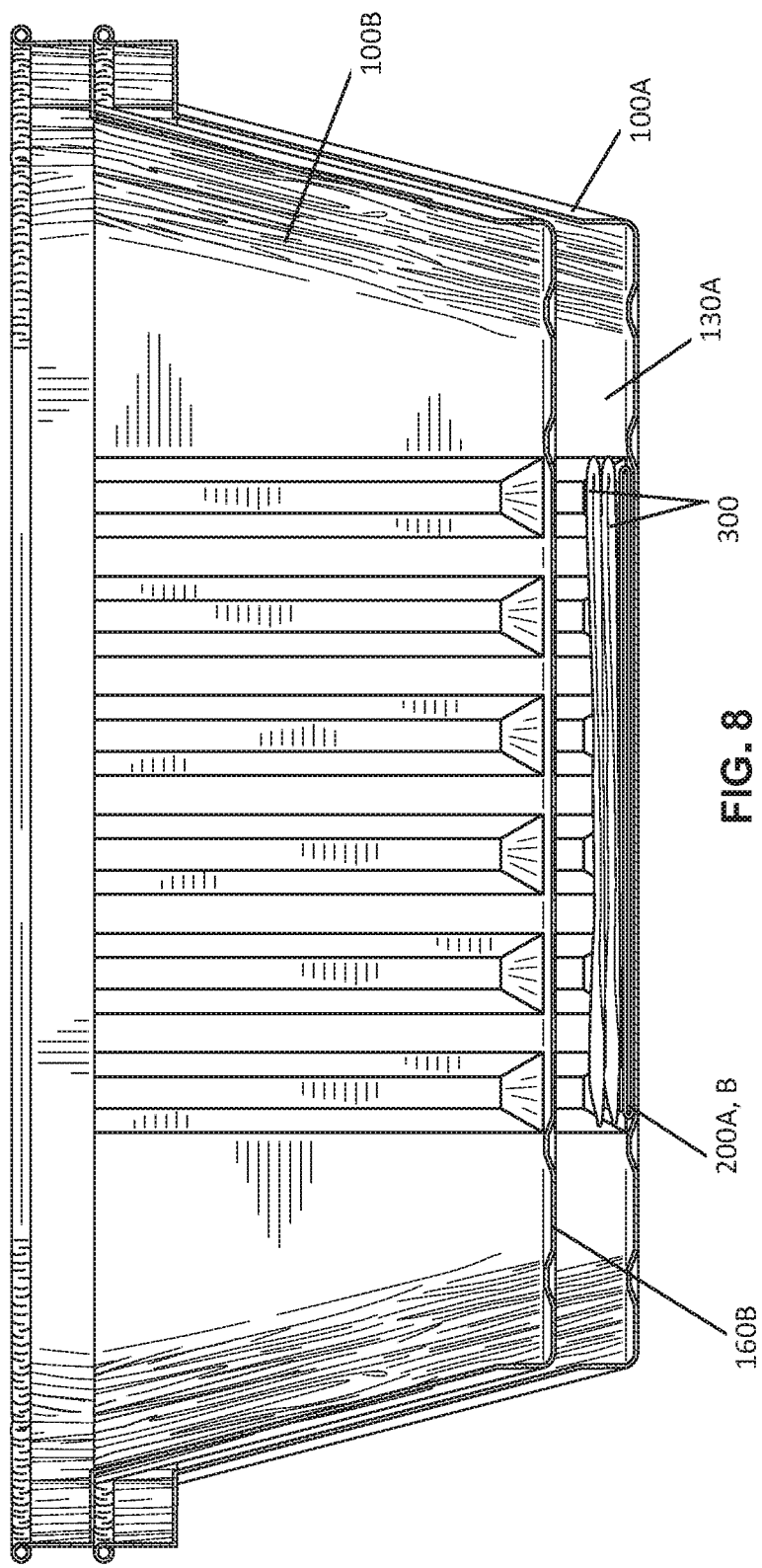
FIG. 8 is a sectional view of FIG. 7.
Figure 9:
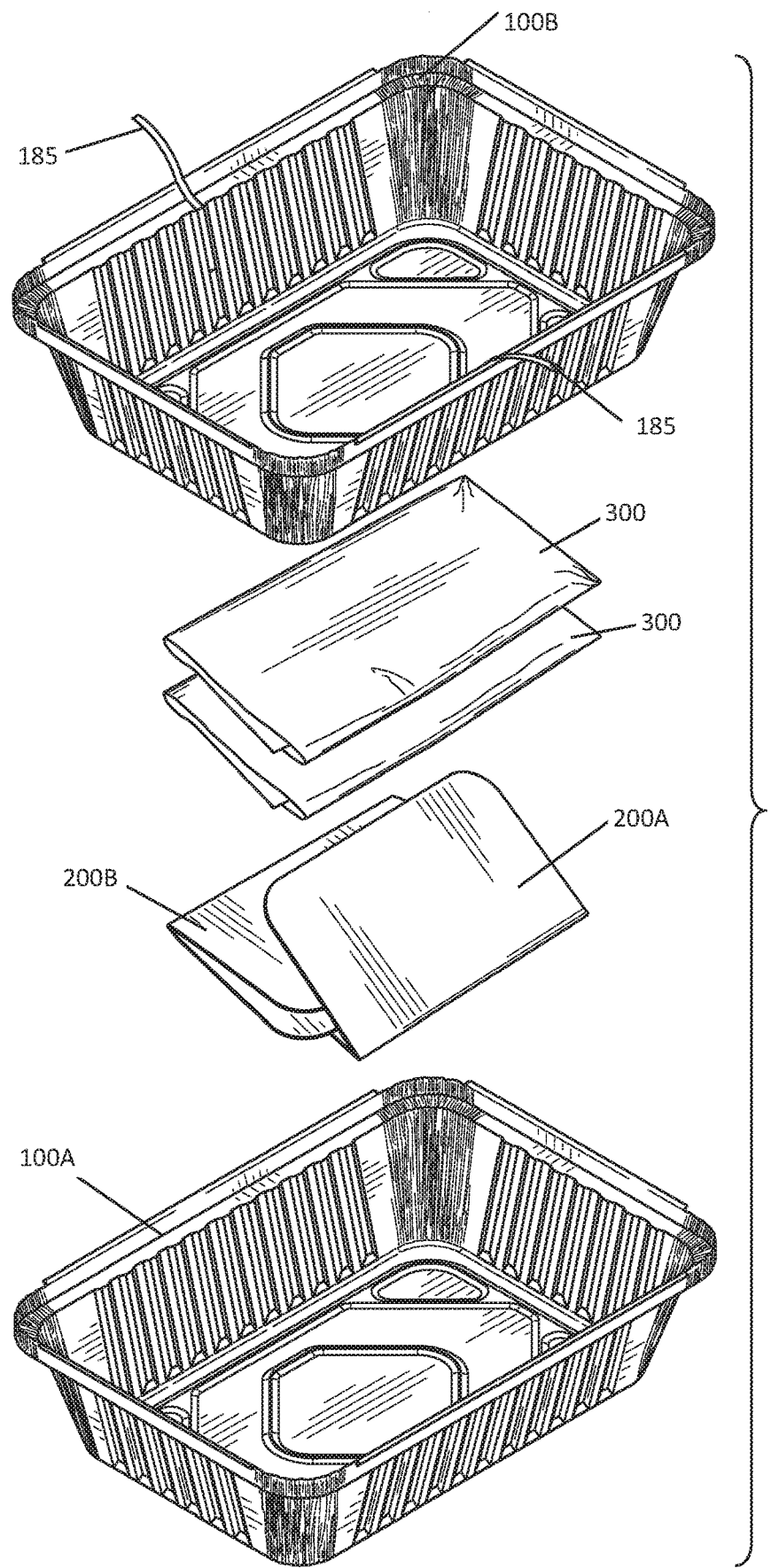
FIG. 9 is an exploded view of the components of FIG. 7.
Figure 10:
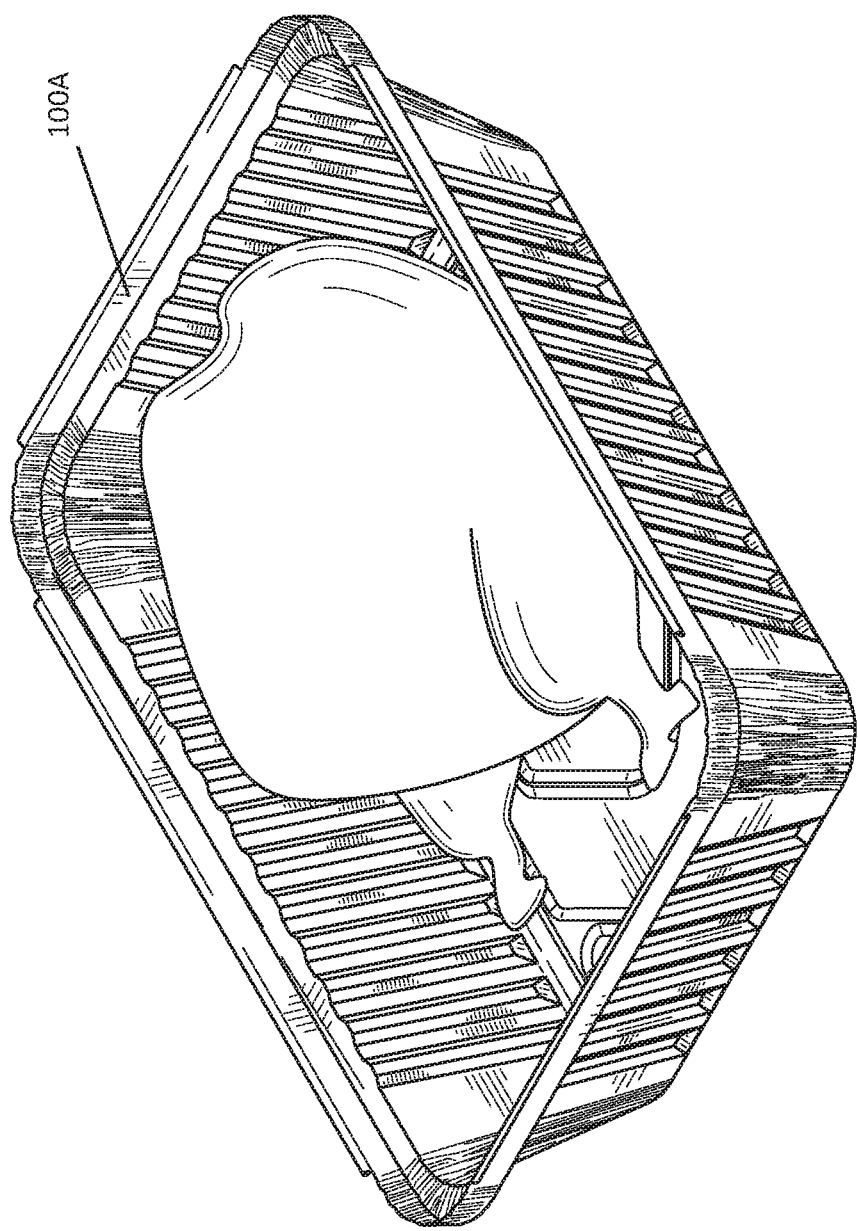
FIG. 10 is a perspective view of a pan and prepared food.
Figure 11:
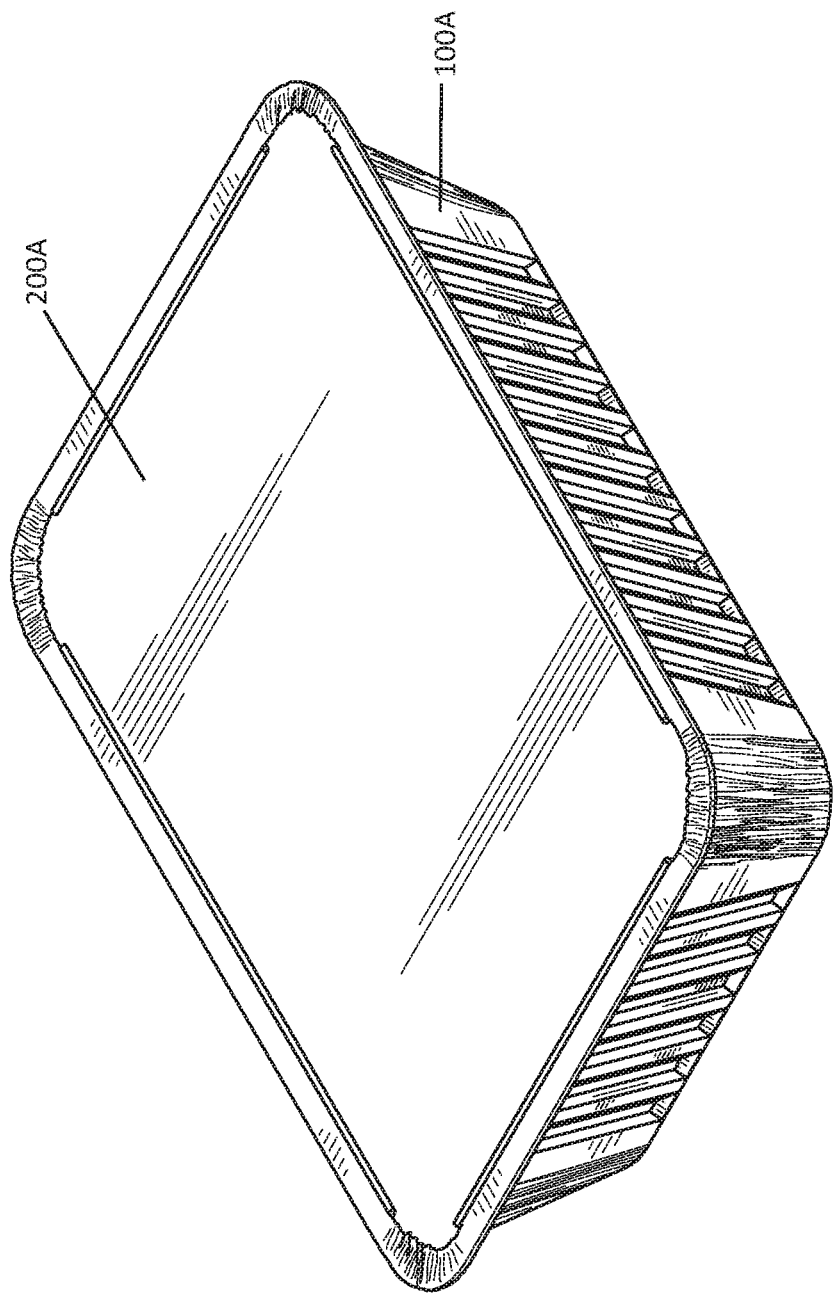
FIG. 11 is a perspective view of FIG. 10 illustrated with a lid secured on to the pan.
Figure 12:
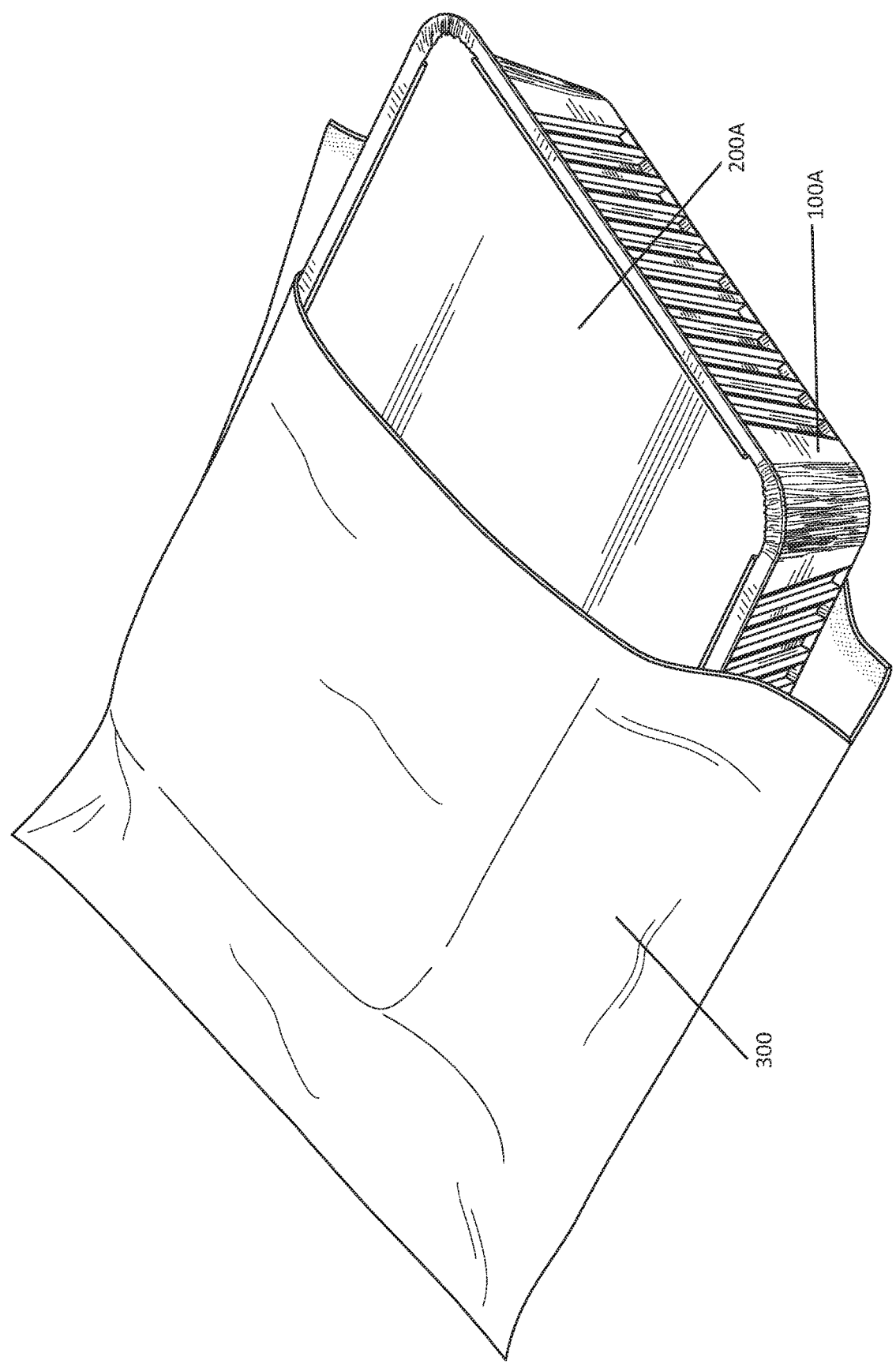
FIG. 12 is a perspective view of the lid and pan from FIG. 11 being inserted into a thermal bag.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

With reference to FIGS. 1-6 there is provided a pan 100, used for baking, roasting, or simply used for preparing and storing food. The pan 100 includes a bottom base 110 terminated to a bottom edge that meets with a sidewall 120. The sidewall may be a single continuous sidewall or be sectioned into various sides (i.e. front, rear, left, right, or angled sides). Therefore, the shape of the pan may be changed into various geometrically shapes, such as but not limited to a square, rectangular, circular, or other symmetrical polygonal shape. The sidewall 120 extends upwardly forming a depression or well 130 for which food can be placed. The sidewall 120 terminates at an edge 140 where it meets and forms into an outwardly extending rim 145. The ridge 125 may have a length away from the sidewall that is uniformly dimensioned around the entire sidewall or it may extend further about a pair of opposing sides or edges of the pan 100 to form handles. The rim 145 further curls into a bead 150 that surrounds the outer edge of the pan 100.

As is common with the commercial sale of these types of pans 100, a lid 200 is often sold with the pan. The lid 200 can have an inverted shape similar to the pan, such that it includes a top 210 terminating to a top edge that meets a skirt 220 that can be a single continuous wall. The shoulder 220 extends forming an interior space 230 and which terminates to a ledge 240. The ledge 240 further includes upward circumvential rim 250 with ridges 255 spaced apart, such that the lid 200 can secured onto the outwardly extending rim 145 of the pan 100. When secured, the rim 145 secures under the ridges 255 to frictionally hold the lid in position.

For initial storage or sale of the product, referred to herein as a first or shipping configuration, the pan 100 and lid 200 can be packaged together. The lid 200 is secured to the underside of the pan 100, such that the interior space 230 of the lid is adjacent the outside surface 160 of the well 130. In this configuration, the ridges 255 of the lid and bead 150 on the pan 100 still work in concert to secure the two together. For use, the lid is frictionally removed so the user can utilize the pan 100 in preparing food. The prepared food can then be covered with the lid being placed such that the interior space 230 rests over the well 130, referred to herein as the second or end configuration.

For purposes of one of the embodiments of the present invention, a thermal bag 300 is packaged with the pan and lid combination. The thermal bag 300 is used to maintain the temperature of prepared foods, either in a hot or cold state. Thermal bag 300 are typically lined or made with thermal insulation material and are known in the art. While there is a loss of heat or cold over time, the general reference made herein to maintaining a general range of the temperature of prepared food for a given period of time and not necessarily referring to maintaining a constant temperature. The bag 300 includes a cavity 310 defined by a pair of panels 320 and 330 which are sealed on its sides 340 and bottom end 350. One of the panels 320 may be longer than the other to create a flap 360. The flap 360 in some embodiments may include a securing mechanism 370, such as an adhesive that permits the flap 360 to close access to the cavity 310 in a closed position. The securing mechanism 370 may include an adhesive 380 that is covered with a removable strip 390 of material; however, other securing mechanism can be used, such as hook and loop closures 372 (FIG. 6C) cooperatively secured on one of the bag and on the outside of the bag to allow the flap to seal the opening; magnets 374 (FIG. 6D) cooperatively secured underneath or on top of the surface the bag aligned such that the flap can fold over and seal the opening of the bag; hook and loop closures 372 (FIG. 6C) cooperatively secured on one of the bag and on the outside of the bag to allow the flap to seal the opening; zippers; etc. The thermal bag is designed such that the entire pan and/or lid easily fits within the cavity and allows the bag to be sealed or closed to help maintain the temperature of the prepared food.

In one embodiment the thermal bag 300 can be secured between the interior space 230 of the lid and the adjacent outside surface 160 of the well 130 when the pan and lid are in an initial configuration (FIG. 1).

In use, once the pan, lid, and thermal bag are separated from their first configuration, the pan is used to prepare food, either hot or cold food. The lid is used to secure the food within the pan and the lid/pan and prepared food is inserted into the cavity 310 of the thermal bag 300. The thermal bag is then sealed to help maintain a temperature of the prepared food.

Referring now also to FIGS. 7-12, similar to the above embodiments similar terms and reference numerals will be shared throughout the figures. As illustrated in FIGS. 7-12 there is a different pan and lid configuration, however, the pan and lid are shipped together in a first or initial configuration. As shown, a pair of pans 100A and 100B are fitted one inside the other, with folded lids 200A and 200B packaged and shipped between the two the inside well 130A of the lower pan and the outside surface 160B of the well 130B of the upper pan. In addition, thermal bags 300 are positioned with the lids 200. The paid of pan 100A and 100B can be secured together by a shrink wrap or tape 185.

Similarly, once separated food can be placed in the pan 100A and then prepared. A lid 200A can then be used to secure the prepared food in place. All of which can then be inserted into the cavity of the thermal bag to help maintain a temperature of the prepared food. Similarly, a securing mechanism 370 can be used to seal the bag closed.

Figure 13:
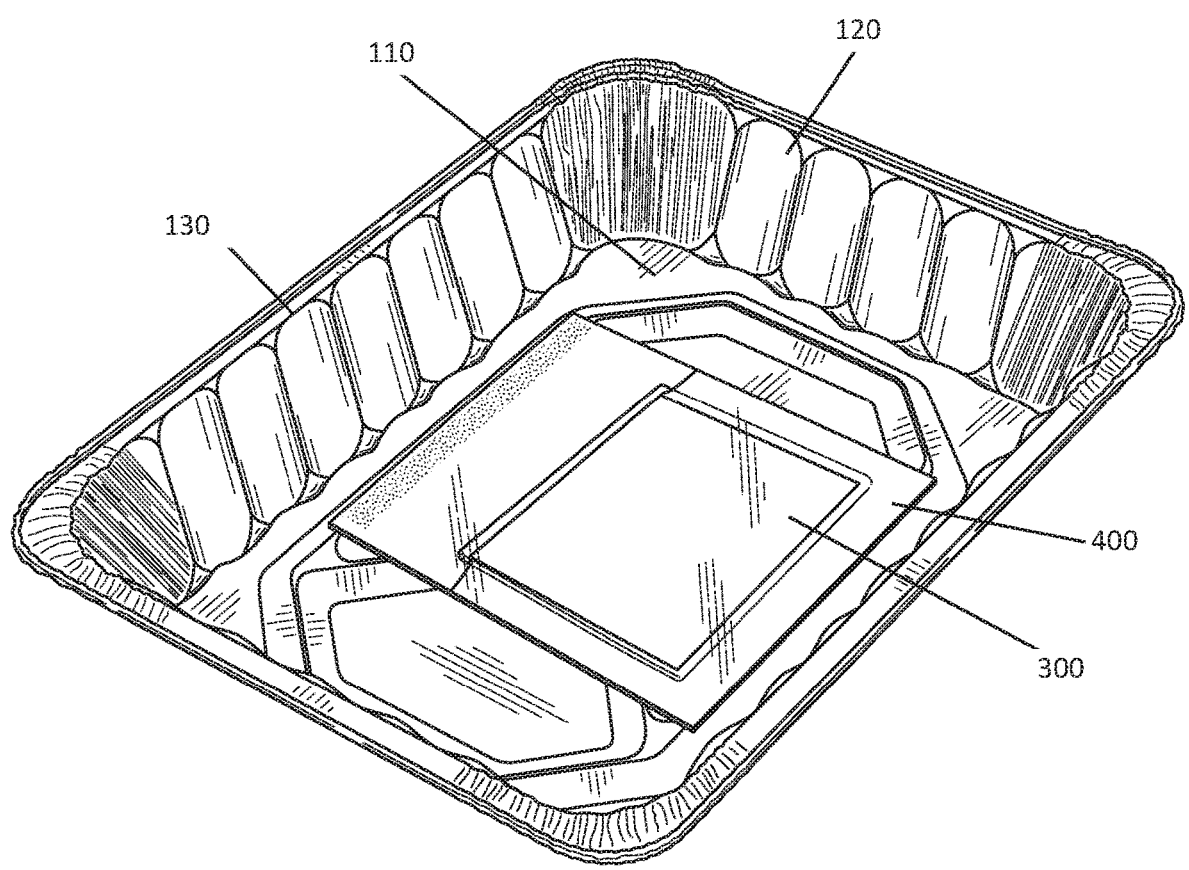
FIG. 13 is a perspective view of a pan having a label pouch for holding at least a thermal bag in accordance with another embodiment of the invention.
Figure 14:
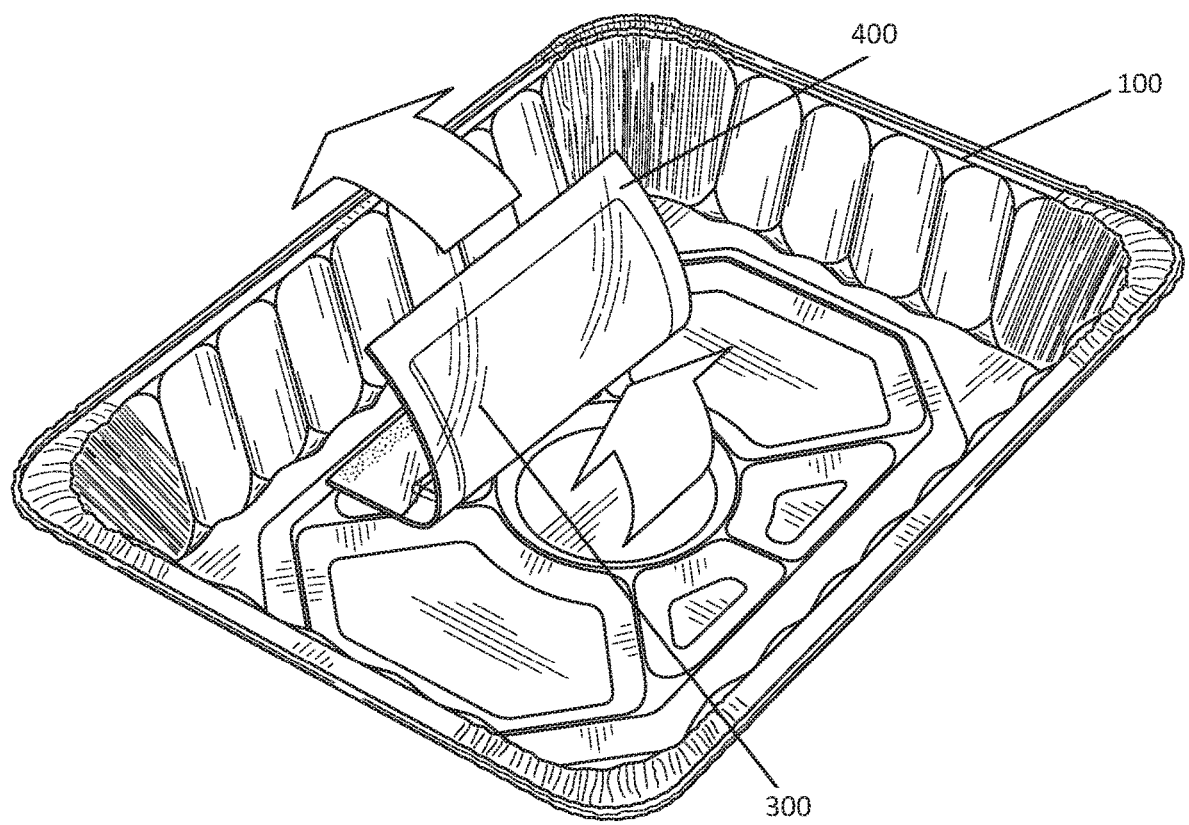
FIG. 14 is a perspective view of a pan having a label pouch for holding at least a thermal bag in accordance with another embodiment of the invention.
Figure 15:
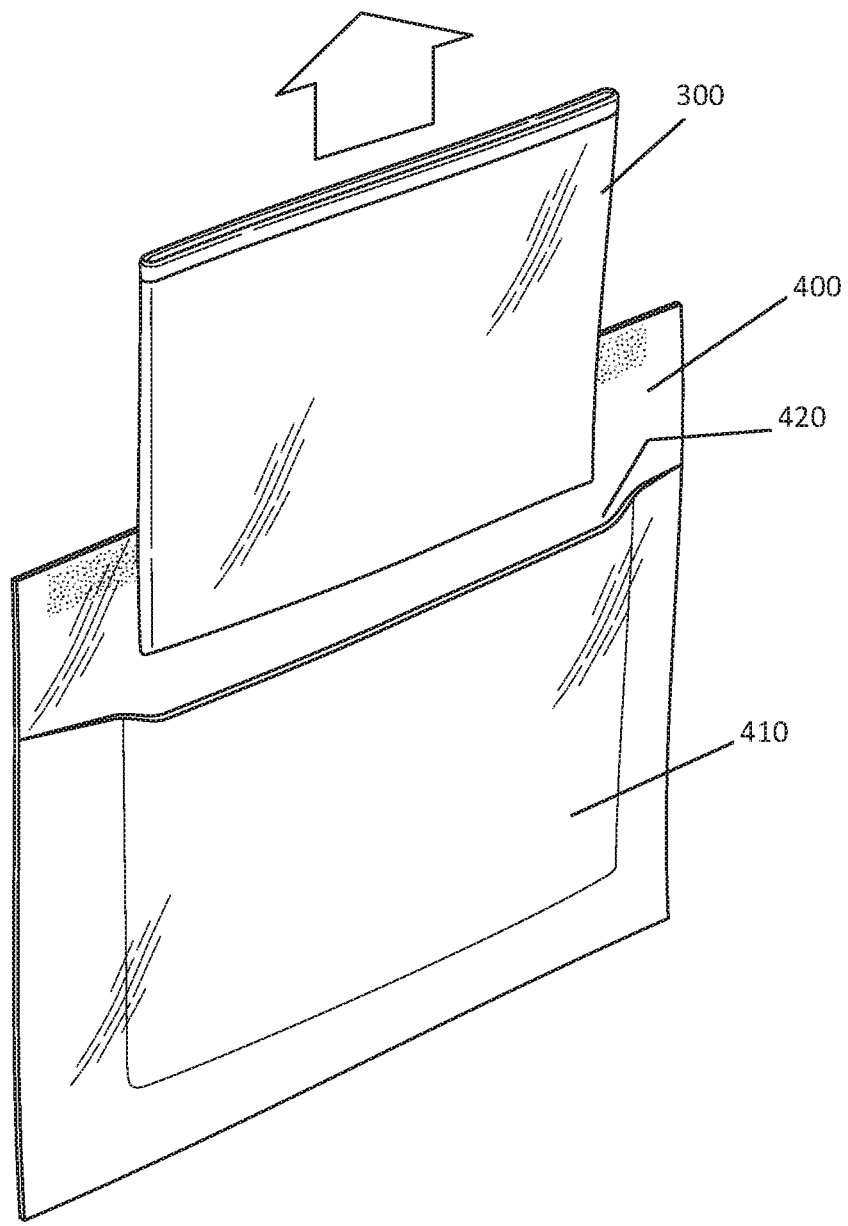
FIG. 15 is a perspective view of the label pouch and thermal bag from FIG. 13.

Referring now to FIGS. 13-15, in other embodiments of the invention there are provided different methods of attaching the thermal bag to a pan 100. In a first step, a pan 100 is provided to include at least a bottom portion 110 and sides 120 extending from the bottom portion 110 to form a well 130. In a second step, a label 400 is provided which can be affixed to a portion of the pan, such as the bottom portion, inside the well, on the outside of the pan, etc. The rear side of the label 400 would include a means of securing the label to the pan itself, such as a strip of adhesive, glue or epoxy spots, etc. The label 400 can be removed from the pan and which has a pocket 410 formed on one side of the label 400 to define an interior pocket region 420. The thermal bag 300 is placed within the pocket region 420. When the label is removed from the pan, the thermal bag 300 can also be removed and then used as described above, i.e. to receive the entire pan and prepared food and then sealed for transport.

Figure 16:
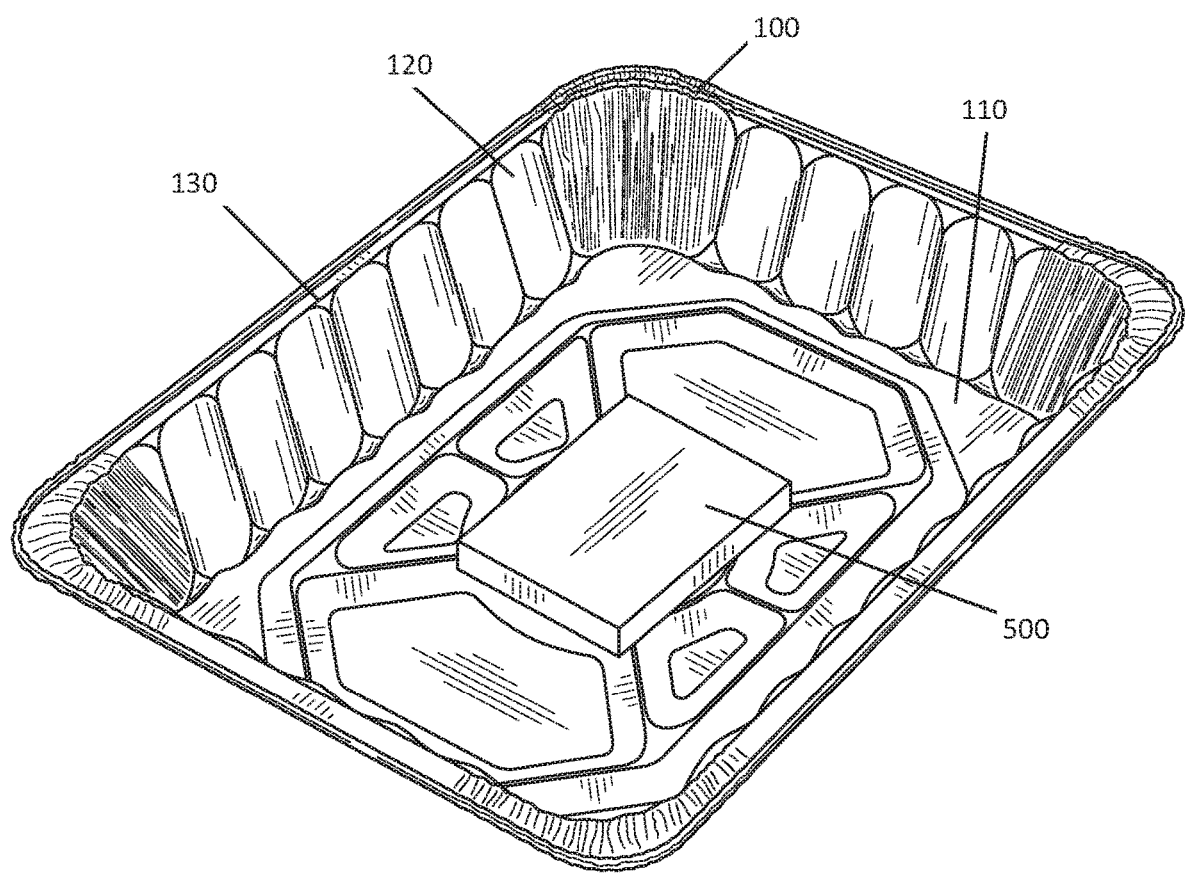
FIG. 16 is a perspective view of a pan having a box for holding at least a thermal bag in accordance with another embodiment of the invention.
Figure 17:
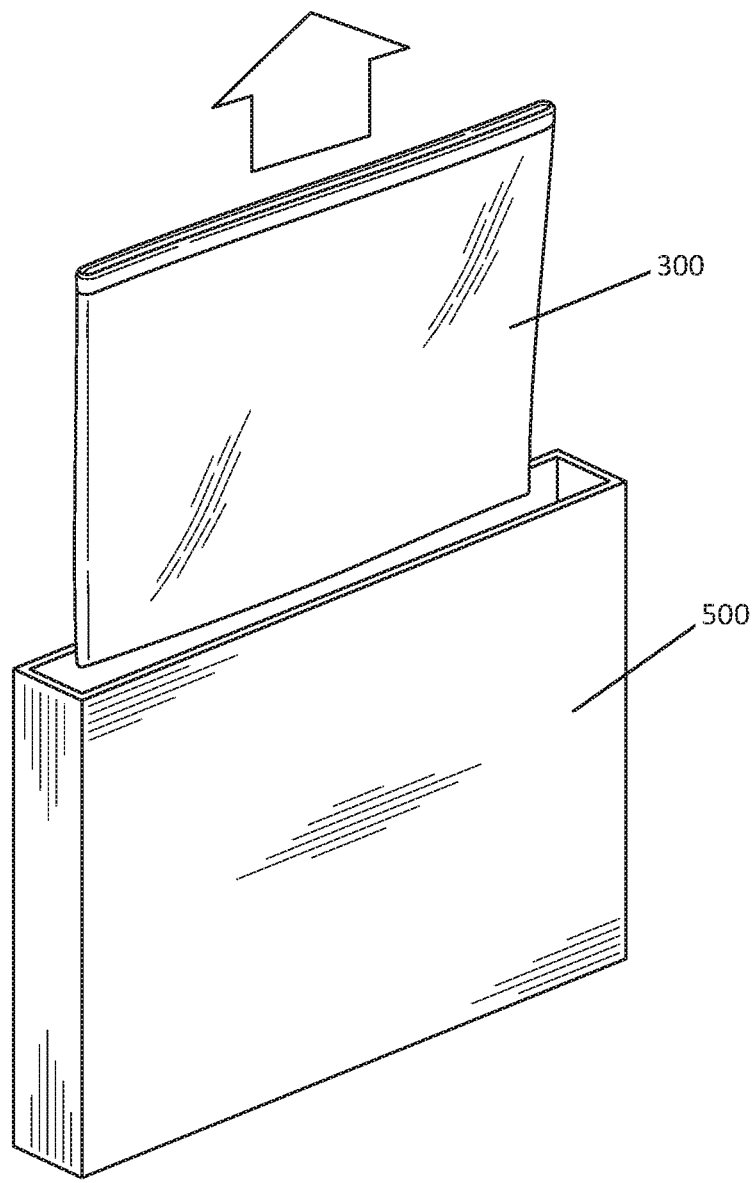
FIG. 17 is a perspective view of the box and thermal bag from FIG. 16.

Referring now to FIGS. 16 and 17, in another aspect of the invention the thermal bag 300 could be placed inside a box 500, which is then affixed to the bottom portion 110 of the pan 100. The small box 500 could be substantially flat to hold the bag and thus not take up a large area, especially for transport and display on shelves. The thermal bag 300 could simply be removed from the box 500 prior to use.

In another aspect of the invention, the thermal bag 300 could be secured directed to the bottom portion of the pan. An adhesive, epoxy or tape could be used to affix the thermal bag directly to the pan. While not shown, it is preferable that the pans include a lid before being inserted into the bag, the lid can be as outlined herein, or made of various materials such as a metal, plastic, aluminum foil, laminate, or a combination thereof.

One of the main advantages of the present embodiment is that it provides a flat, easy, and inexpensive manner for transporting the thermal bags with the pan and lids. Therefore, the pans can still be stacked or nested with each other for display on the store and when separated for individual purchase, the thermal bags, will separate and be purchased by the consumer as a single combined kit or item.

In furtherance of the figures provided herein there is thus in one or more embodiments a combination of a pan, lid, and thermal bag. The combination defines the pan such that it is configured for use to prepare food or have prepared food placed therein. The pan has a bottom base with a base periphery edge and a sidewall extending upwardly from the base periphery edge that terminates at a side edge to create a well therebetween. The lid is configured for use with the pan and has a top surface with a top periphery edge and a continuous skirt extending downwardly from the top surface to define an interior space therebetween. The lid further includes a ledge extending from the terminating edge of the skirt that has circumvential rim with one or more ridges spaced around the rim.

The pan and lid are arranged in an initial configuration defined by having the lid inverted under the pan such that an underside of the well is situated into the interior space of the lid and the one or more ridges secure over the rim of the pan. In this configuration, the thermal bag is secured between the underside of the well and the interior space of the lid. The initial configuration is ideal for storage, shipping and display in stores for sale.

Importantly, the pan and lid are reconfigurable from the initial configuration into an end configuration defined by having the lid situated over the pan such that the interior space of the lid faces the well and the one or more ridges secure under the rim of the pan and configured to maintain prepared food placed in the well of the pan.

In this end configuration, the thermal bag is easily separated from the pan and lid. The thermal bag has a cavity configured to receive the pan and lid in the end configuration while the prepared food is placed in the well of the pan. The thermal bag also has a flap end defined to fold over the cavity to close the cavity. Lastly, the thermal bag is made of a material to aid in maintaining a temperature of prepared food when placed within the cavity of the thermal bag.

In other embodiments, the flap end can be configured to include a securing mechanism to create a closed configuration of the thermal bag once the pan, lid, and prepared food is inserted into the cavity. The securing mechanism may be a removable strip of material positioned over a layer of adhesive.

In another embodiment there may be provided in combination at least two nested pans with corresponding lids and thermal bags. Each pan is configured for use to prepare food. The pan defined by a bottom base having a base periphery edge and a sidewall extending upwardly from the base periphery edge and terminating at a side edge to create a well therebetween. The pan further having a rim extending outwardly from the side edge and further having a ledge extending upwardly from the rim. One of the nested pans is positioned in the other nested pan such that the wells of the nested pans are substantially adjacent to each other.

Each lid is configurable into a folded configuration and positioned between the substantially adjacent wells of the at least two pans for transport. Each lid is removable from the at least two pans and unfolded to a substantially flat configuration for use with one of the at least two pans. The lid in the flat configuration has a periphery edge defined to rest on the rim of the pan wherein the ledge of the pan is configured to bend over the periphery edge of the lid to define an end configuration that is further defined to maintain prepared food placed in the well of the pan. The nest pans are secured together by at least a pair of pieces of tape removably positioned over the nested pans to maintain the pans in the initial configuration.

Each thermal bag is secured between the substantially adjacent wells of the at least two pans when the at least two pans and at least two lids are in the initial configuration for transport. The pair of thermal bags are separable therefrom when the pans and lids are moved from the initial configuration to the end configuration. Each thermal bag has a cavity and a flap end defined to fold over the cavity. The cavity is configured to receive the pan and lid in the end configuration and with prepared food placed in the well of the pan. The thermal bag being made of a material to aid in maintaining a temperature of prepared food when placed within the cavity of the thermal bag.

Similarly, to the above product combinations, one or more embodiments of the present invention can be address by a method of maintaining a temperature in prepare foods. The method is outlined by providing a pan, lid, and thermal bag as discussed in various embodiments above. While in transport, shipping or point of sale displays, the method positions the pan and lid in an initial configuration defined by having the lid inverted under the pan such that an underside of the pan well is situated into the interior space of the lid and one or more ridges on the lid are configured to secure over the top surface of the rim of the pan. In this initial configuration, the method secures the thermal bag between the underside of the well and the interior space of the lid capturing the thermal bag.

The method then requires reconfiguring of the pan and lid from the initial configuration to an end configuration defined by having the lid situated over the pan such that the interior space of the lid faces the well and the one or more ridges secure under the rim of the pan, allowing food that is prepared to be placed in the well of the pan prior to the pan and lid being positioned into the end configuration. During reconfiguring, the thermal bag is separated from the pan and lid when they are moved out of the initial configuration. The method would then configure a cavity of the thermal bag to receive the pan and lid in the end configuration and with prepared food placed in the well of the pan. The thermal bag is configured to maintain a temperature of prepared food when the pan and lid with the prepared food placed therein is further positioned within the cavity of the thermal bag by having the thermal bag being made of a material configured to assist in maintaining an internal temperature within the cavity.

From the foregoing and as mentioned above, it will be observed that numerous variations and modifications may be affected without departing from the spirit and scope of the novel concept of the invention. It is to be understood that no limitation with respect to the specific methods and apparatus illustrated herein is intended or should be inferred. It is, of course, intended to cover by the appended claims all such modifications as they would fall within the scope of the claims.

We claim:

1. A combination comprising:
a pan configured for use to prepare food, the pan defined by a bottom base having a base periphery edge and a sidewall extending upwardly from the base periphery edge and terminating at a side edge to create a well therebetween;
a lid configured for use with the pan, the lid defined by having a top surface with a top periphery edge and a continuous skirt extending downwardly from the top surface to define an interior space therebetween, the lid further includes a ledge extending from a terminating edge of the skirt, wherein the ledge includes a circumvential rim with one or more ridges spaced around the rim;

wherein the pan and lid are configured in an initial configuration defined by having the lid inverted under the pan such that an underside of the well is situated into the interior space of the lid and the one or more ridges configured to secure over the rim of the pan, and wherein the pan and lid are reconfigurable from the initial configuration into an end configuration defined by having the lid situated over the pan such that the interior space of the lid faces the well and the one or more ridges secure under the rim of the pan and configured to maintain prepared food placed in the well of the pan;

a thermal bag having a cavity and a flap end defined to fold over the cavity, the cavity configured to receive the pan and lid in the end configuration and with prepared food placed in the well of the pan, and wherein the thermal bag being made of a material to aid in maintaining a temperature of prepared food when placed within the cavity of the thermal bag, and wherein the thermal bag is secured between the underside of the well and the interior space of the lid in the initial configuration and separable therefrom when the pan and lid are moved from the initial configuration to the end configuration and wherein the flap end has a securing mechanism to create a closed configuration of the thermal bag once the pan, lid, and prepared food is inserted into the cavity.

2. The combination of claim 1, wherein the securing mechanism is a removable strip of material positioned over a layer of adhesive.

3. The combination of claim 1, wherein the securing mechanism includes placing a first set of magnets along the flap configured to secure to a second set of magnets along an outside portion of the bag, the first and second set of magnets configured to secure the flap such that the thermal bag is in the closed configuration.

4. The combination of claim 1, wherein the securing mechanism includes hook and loop fastening along the flap and an outside portion of the bag configured to secure the flap such that the thermal bag is in the closed configuration.

5. A combination comprising:
at least two nested pans, each pan configured for use to prepare food, the pan defined by a bottom base having a base periphery edge and a sidewall extending upwardly from the base periphery edge and terminating at a side edge to create a well therebetween, the pan further having a rim extending outwardly from the side edge and further having a ledge extending upwardly from the rim, and wherein one of the nested pans is positioned in the other nested pan such that the wells of the nested pans are substantially adjacent to each other;

at least two lids corresponding to the at least two nested pans, each lid configurable into a folded configuration and positioned between the substantially adjacent wells of the at least two pans for transport, and each lid being removable from the at least two pans and unfolded to a substantially flat configuration for use with one of the at least two pans, the lid in the flat configuration has a periphery edge defined to rest on the rim of the pan wherein the ledge of the pan is configured to bend over the periphery edge of the lid to define an end configuration further defined to maintain prepared food placed in the well of the pan;

at least a pair of pieces of tape removably positioned over the nested pans to maintain the pans in the initial configuration;

a pair of thermal bags being secured between the substantially adjacent wells of the at least two pans when the at least two pans and at least two lids are in the initial configuration for transport and the pair of thermal bags being separable therefrom when the pans and lids are moved from the initial configuration to the end configuration, each thermal bag having a cavity and a flap end defined to fold over the cavity, the cavity configured to receive the pan and lid in the end configuration and with prepared food placed in the well of the pan, and wherein the thermal bag being made of a material to aid in maintaining a temperature of prepared food when placed within the cavity of the thermal bag and wherein the flap end has a securing mechanism to create a closed configuration of the thermal bag once the pan, lid, and prepared food is inserted into the cavity.

6. The combination of claim 5, wherein the securing mechanism is a removable strip of material positioned over a layer of adhesive.

7. The combination of claim 6 wherein the securing mechanism includes placing a first set of magnets along the flap configured to secure to a second set of magnets along an outside portion of the bag, the first and second set of magnets configured to secure the flap such that the thermal bag is in the closed configuration.

8. The combination of claim 7, wherein the securing mechanism includes hook and loop fastening along the flap and an outside portion of the bag configured to secure the flap such that the thermal bag is in the closed configuration.

* * * * *